United States Patent
Maes (10) Patent No.: US 9,358,679 B2
(45) Date of Patent: Jun. 7, 2016

(54) MOBILE WORK STATION

(71) Applicant: Roger V. Maes, Sequim, WA (US)

(72) Inventor: Roger V. Maes, Sequim, WA (US)

(73) Assignee: AMAESING TOOL MANUFACTURING INC., Sequim, WA (US)

( * ) Notice: Subject to any disclaimer, the term of this patent is extended or adjusted under 35 U.S.C. 154(b) by 0 days.

(21) Appl. No.: 14/818,065

(22) Filed: Aug. 4, 2015

(65) Prior Publication Data

US 2016/0039086 A1 Feb. 11, 2016

Related U.S. Application Data

(60) Provisional application No. 62/034,386, filed on Aug. 7, 2014.

(51) Int. Cl.
| | |
|---|---|
| B25H 1/08 | (2006.01) |
| B25H 1/10 | (2006.01) |
| B25H 1/12 | (2006.01) |
| B25H 1/04 | (2006.01) |
| B62B 3/02 | (2006.01) |

(52) U.S. Cl.
CPC .. B25H 1/04 (2013.01); B25H 1/08 (2013.01); B25H 1/10 (2013.01); B25H 1/12 (2013.01); B62B 3/02 (2013.01)

(58) Field of Classification Search
CPC .......... B25H 1/08; B25H 1/10; B21D 37/147; B21D 7/00
USPC ........................ 269/45, 56, 58; 108/14, 16, 25
See application file for complete search history.

(56) References Cited

U.S. PATENT DOCUMENTS

| | | | | | |
|---|---|---|---|---|---|
| 2,695,830 | A * | 11/1954 | Oden | ...................... | A63H 19/00 108/14 |
| 3,043,360 | A * | 7/1962 | Hutchison | .............. | B21D 7/022 72/219 |
| 3,923,443 | A * | 12/1975 | Emery | .................. | B29B 13/025 425/384 |
| 3,982,739 | A * | 9/1976 | Maes | ...................... | B25B 5/147 269/101 |
| 4,564,181 | A * | 1/1986 | Gansel | ...................... | B25H 1/08 108/12 |
| 4,759,560 | A * | 7/1988 | Virgulti | .................... | B25H 3/00 180/53.8 |
| 4,779,856 | A * | 10/1988 | Beeler | ................ | B23K 37/0533 269/287 |
| 5,193,769 | A * | 3/1993 | Hofle | ........................ | F16L 3/11 248/59 |
| 5,681,255 | A * | 10/1997 | Simmons | ................. | B25H 1/02 493/346 |
| 5,730,252 | A * | 3/1998 | Herbinet | .............. | B65G 1/1371 186/52 |
| 6,029,721 | A * | 2/2000 | O'Banion | ............ | B23D 47/025 144/286.5 |
| 6,173,799 | B1 * | 1/2001 | Miyazaki | ............ | B60L 11/1822 180/19.3 |
| 6,357,986 | B1 * | 3/2002 | Sonnamaker | .......... | B65G 13/12 187/240 |

(Continued)

*Primary Examiner* — Joseph Rocca
*Assistant Examiner* — Travis Coolman
(74) *Attorney, Agent, or Firm* — Innovation Law Group, Ltd.; Jacques M. Dulin, Esq.

(57) ABSTRACT

An industrial grade, field-usable Mobile Work Station, comprising a rolling cabinet having lockable internal storage, which is fitted with precision-adjustable, tubular rails on one or more sides to which special compound clamp-vice assemblies may be mounted at a plurality of locations to engagingly retain work pieces and hand and power tools, and which includes tool holders and an under-chassis rack for retaining a battery to power tools. An exemplary MWS is shown in which the X, Y and Z axes of pipe rails may be micro-adjusted to be in precise orthogonal relationship so that precision work may be accomplished in the field, even where the surface is not level. Leveling jacks are provided at one end of the cabinet to permit precise horizontal leveling of the cabinet pipe rails in both X and Y axes. Power tools include saws, grinders, welding spinners, benders, vices, anvils, drills, and the like.

19 Claims, 11 Drawing Sheets

(56) References Cited

U.S. PATENT DOCUMENTS

| | | | | |
|---|---|---|---|---|
| 6,412,764 B1 * | 7/2002 | Hebert | B25B 5/006 | 269/246 |
| 6,641,148 B2 * | 11/2003 | Schmidt | B25H 3/02 | 280/35 |
| 6,725,971 B1 * | 4/2004 | Bair | B25H 1/06 | 182/182.2 |
| 6,758,393 B1 * | 7/2004 | Luciano | G06Q 20/20 | 235/379 |
| 6,758,449 B1 * | 7/2004 | Chen | B23Q 1/74 | 248/146 |
| 6,912,886 B1 | 7/2005 | Maes | | |
| 6,931,715 B2 * | 8/2005 | Lawrence | B25B 11/02 | 269/45 |
| 7,000,447 B1 * | 2/2006 | Burkhart | B21D 7/02 | 72/389.1 |
| 7,044,374 B2 * | 5/2006 | Allison | G06K 7/10881 | 235/384 |
| 7,156,273 B2 * | 1/2007 | Morris | B60R 9/06 | 108/14 |
| 7,159,496 B2 | 1/2007 | Maes | | |
| 7,172,105 B2 | 2/2007 | Maes | | |
| 7,240,707 B1 * | 7/2007 | Schweitzer | B25H 1/10 | 144/286.5 |
| D667,469 S * | 9/2012 | Kroening | D15/122 | |
| 8,924,258 B2 * | 12/2014 | Knoll | G07G 1/0018 | 235/379 |
| 2002/0179181 A1 * | 12/2002 | Murphy | B25H 1/04 | 144/286.5 |
| 2003/0034602 A1 * | 2/2003 | Kavanaugh | B25B 11/00 | 269/45 |
| 2003/0213648 A1 * | 11/2003 | Dembicks | B23D 47/025 | 182/185.1 |
| 2005/0173853 A1 * | 8/2005 | Maes | B23D 45/12 | 269/45 |
| 2009/0065752 A1 * | 3/2009 | Doyle | B66F 1/08 | 254/93 R |
| 2011/0079947 A1 * | 4/2011 | Masters | B25H 1/10 | 269/296 |
| 2011/0232535 A1 * | 9/2011 | Hung | A61B 19/0248 | 108/25 |
| 2012/0217850 A1 * | 8/2012 | Sharperson | B25H 1/12 | 312/30 |
| 2012/0248719 A1 * | 10/2012 | Rossini | A61G 12/001 | 280/29 |
| 2014/0279119 A1 * | 9/2014 | Knoll | G07G 1/0018 | 705/23 |
| 2015/0223348 A1 * | 8/2015 | Sagar | G06F 1/26 | 713/340 |

* cited by examiner

MOBILE WORK STATION

CROSS-REFERENCE TO RELATED APPLICATION

This is the Regular US Patent Application corresponding to, and claiming priority of, U.S. Provisional Application 62/034,386 filed Aug. 7, 2014 of the same inventor and invention under the same title, the benefit of the filing date of which is claimed under 35 USC §§119 and 120.

FIELD

The invention relates to mobile workstations and more particularly to an industrial grade, rolling cabinet having lockable internal storage, which is fitted with precision-adjustable, tubular rails on three sides to which special compound clamp assemblies may be mounted at a plurality of locations, and which includes tool holders and an under-chassis rack for retaining a battery to power tools. The Mobile Work Station (MWS) of the invention particularly useful at work sites in the field, but may equally be used in an open-air or indoor shop environment. A wide variety of tools are mountable via the clamp assemblies on the rails, including: power cut-off saw; pipe vices and clamps for straight, angle and orthogonal tacking and welding of elbows; a powered foot-controlled spinner assembly for balanced rotation of compound pipe forms for butt welding of pipe joints; a bench grinder; a machinist's vice; a bending tool; and a hanger for flexible shaft tools. A variety of other tools may be adapted to be retained by the special compound clamp/vice assemblies and the tool holders are configured to retain a wide menu of hand tools, including but not limited to: vertical hangers; screw drivers; gauges; levels; files; pliers; welding rods; welding electrode holders; ground clamps; C-clamps; magnetic work-piece positioners; utility knives; snips; drivers; hex keys; and the like.

BACKGROUND

Construction, particularly welding and pipe-fitting field work is highly challenging, as most jobs are in large part custom. That is, the assemblies being made must be hand measured, constructed and fitted to a particular job. It is between rare and never that a factory-constructed structure fits properly in the field. Thus, for example pipe-fitting is a complex trade, approaching an art, wherein pipe runs must be measured in the field before welding. Allowances must be made for flanges, elbows, bends and obstructions. The latter is particularly problematic, where an obstruction must be routed-around, and requires complex compound turns or bends to provide the runs of the fewest simple bends. The more bends in a water or steam line, the greater the internal frictional losses, which increases power requirements.

In addition, it is very difficult to align the axes of pipes for welding. The gaps between ends of pipes to be welded should be uniform around the circumference to insure a complete, defect free strong weld. This is particularly difficult in the typical two-stage welding: first tack welding, then full circumferential welding fill-in. When tack welding, the first weld tends to pull one or both pipes out of alignment. The pipe segments must be realigned before the weld cools. In circumferential welding, where the job situation requires welding in arcuate segments of the circumference, as compared to a continuous circumferential weld, defects typically are introduced at the arc junctures.

The need for precision in field jobs goes far beyond welding, extending into cutting, bending, & grinding. Where a precise straight end cut for butt joining or mitering cut is not achieved, the resulting join is necessarily imperfect and subject to failure.

Accordingly, there is a significant unsolved need in the construction trades to have a work station at which precision operations may be accomplished in the field, and which is entirely portable, may be secured, is robust to withstand rough use and bad weather, yet is inexpensive to construct and simple to transport, set up and use.

THE INVENTION

Summary, Including Objects and Advantages

The invention is directed to Mobile Work Stations (MWS), and more particularly to robust work stations that can be deployed in the field to permit production of precision construction an assembly, especially welding and pipe fitting. The inventive MWS comprise a framework mounted on four lockable wheels, which framework has leveling jacks at one end that permit rolling into the field for leveling the framework top surface and side-mounted pipe rails for precision work. In a principal embodiment, the framework is fitted with metal side walls, bottom and top, to form a securable enclosure in which tools, parts, equipment and supplies can be locked. For robustness, steel side walls, top and bottom are preferred, e.g., ¼" thick rolled steel sheet or 18 gauge mild steel sheet, but the side walls may be made of aluminum, stainless steel and the like.

In one embodiment, the top is hinged along one longitudinal wall to permit opening for access into the interior. However, a number of side panels may be hinged or provided with doors for access to one or more interior spaces. Thus a number of doors may be provided in one or more side walls, with each accessing a separate enclosed space in the interior, each being assigned to a different worker or to store different materials or tools. The inventive MWS is generally rectangular in plan view, with two parallel long sides defining a longitudinal direction and two parallel, transverse end walls. However, the shape may be square, hexagonal or any other convenient shape. Optional tool holders may be secured to one or more upper marginal edges of the enclosure. The side panels may be welded or bolted to the internal framework.

A key feature of the inventive MWS is the provision of one or more precision pipe rails located along the front, rear and at least one end(s) of the MWS enclosure. These pipe rails serve as retaining supports for compound vice-clamp system(s) to retain various work pieces and power tools. An exemplary MWS is described herein as having three pipe rails, one each on the front, back and one end side. The pipe rails on the longitudinal side(s) are longer than the respective front and back sides of the MWS enclosure so that the clamps and tools do not interfere with the MWS. Likewise the end pipe rail is wider than the corresponding end wall of the MWS enclosure to which it is mounted.

The pipe rail ends do not interfere with each other because they are each cantilevered-out from the side walls. The axis of the longitudinal side wall pipe rail is termed the X-axis. As to the longitudinal side wall pipe rails, each is supported adjacent their ends by a pair of horizontally oriented support shafts, each of which have an orthogonal axis (the Y-axis) that intersects the X axis of the longitudinal side wall pipe. The support shafts have a length long enough to space the side rails away from the respective MWS enclosure side walls. In the embodiment of the MWS described in detail herein, the horizontal support shafts are pipes having each exterior end fitted with a plug having a horizontally bored hole, the horizontal axis of each bore in the two support shafts being aligned, that is they are in the same horizontal plane as the plane containing the horizontal longitudinal axis of the side wall pipe rail. Each Y-axis of the support shafts is oriented orthogonal to the X-axis of the side wall pipe rail, and all three axes lie in the same horizontal plane.

As to the horizontal, lateral end pipe rail, it is supported adjacent its ends from its underside by a pair of vertically adjustable threaded risers journalled in horizontally-spaced-apart support shafts. In this case, the horizontal support shafts are as described above, but are located below the lateral end pipe rail so that the three axes are not in the same horizontal plane. Rather in this case, the plane defined by the two horizontal support shaft Z-axes lies below, but parallel to a horizontal plane containing the end pipe rail Y-axis. That is, keeping the axes orientation the same as for the longitudinal side walls, the end pipe rail axis is a Y-axis direction, the two support shaft axes are Z-axis directions, and the riser axes are oriented in the Z-axis direction All three axes are orthogonal to each other. Thus, the vertical Z-axes of the risers are disposed orthogonal to the horizontal Y-axis of the end pipe rail, and intersect the Y-axis of the end pipe rail. The spaced, threaded vertical support risers are welded to the underside of the lateral end pipe rail in precise vertical relationship to each other: that is, the support riser vertical Z-axes lie in a common vertical plane which is also orthogonal to the horizontal plane defined by the horizontal Y-axes of the two support shafts. That is, the axis of each of the two support risers intersect the central axis of their respective pipe rail and of their respective support shafts. The vertical adjustment of the risers is accomplished by use of nuts threaded on the riser shafts, and the support shafts ride on these nuts. Simply turning the nuts of the respective risers permits making the end pipe rail precisely level after the MWS is in position in the field, even if it is necessary to position the MWS on uneven ground.

The inner ends of all of the horizontal pipe rail support shafts are received in sleeves, which in turn are secured, as by welding, to the framework or respective side walls. Each sleeve includes a set screw so that once the pipe rail is properly positioned a predetermined distance from the side wall to which it is adjacent, the set screw is tightened, locking the pipe rails in precise orientation.

Referring back to the end pipe rail, the Y-axis of an end pipe rail can be adjusted to be precisely orthogonal to the X-axis of either or both the front side and/or back side pipe rail, and the front and back pipe rails precisely parallel to each other, as required. Once that positioning is accomplished, any work pieces retained by vice-clamps on the respective rails will be precisely orthogonally positioned with respect to each other. Since the unit is mobile, can be wheeled into the field and precisely leveled with the pipe rails precisely orthogonal to each other, the inventive MWS brings precision ordinarily possible only within a shop or factory enclosure out into the field, to obviously great advantage.

An additional precision adjustment is provided in the end pipe rail. As with the longitudinal (front and/or back) pipe rail(s), an end pipe rail is longitudinally supported on its respective horizontal shafts. However, unlike for the longitudinal pipe rails the end pipe rail support shafts are not secured directly to end pipe rail. Rather, each of the shafts accepts a vertically oriented riser, comprising a threaded rod welded to the underside of the end pipe rail. The vertical axis of each riser is oriented to intersect the horizontal, lateral axis of the end pipe rail, and then welded in place. Each riser passes through a vertical hole provided in the respective support shafts. A pair of nuts are threaded on each riser to effect precise adjustment of the lateral central axis of the end pipe rail to intersect the axis of either or both of the longitudinal, front and back pipe rails.

It should be understood that one or more pipe rail(s) may be installed vertically, following the principles for support and adjustment described above. While the embodiments of the MWS shown and described herein employ three horizontal pipe rails on three of the sides of the MWS enclosure, more or less than three pipe rails may be installed. Thus, pipe rails may be installed on all 4 sides, or alternately, sleeves may be provided on the interior of the enclosure on each of the 4 sides to receive rail support shafts, but the rails need not be mounted in the sleeves until needed, as desired for a specific job. Thus, from 1-4 pipe rails, including their precisely located support shaft pairs may be supplied with the MWS as accessories for installation as needed.

The compound vice-clamps useful with the inventive MWS comprise a universal body having V-saddles oriented so that there is an upper and lower saddle in complementary horizontal orientation (with the V apices lying in the same plane), and at least one third V-saddle oriented vertically and orthogonally to the upper and lower saddle. Then C-clamps engage grooves provided in the universal body in order to clamp the body to the pipe rails via the lower V-saddle, while a tool or work piece is clamped by another C-clamp to the corresponding upper V-saddle. The work piece center axis is thus precisely parallel with the axis of the pipe rail to which it is clamped. The vertical V-saddle may be used to clamp a work piece or tool having a support pipe to one side.

BRIEF DESCRIPTION OF THE DRAWINGS

The invention is described in more detail with reference to the drawings, in which.

DETAILED DESCRIPTION, INCLUDING MODES OF CARRYING OUT THE INVENTION

The following detailed description illustrates the invention by way of example, not by way of limitation of the scope, equivalents or principles of the MWS invention. This description will clearly enable one skilled in the art to make and use the invention, and describes several embodiments, adaptations, variations, alternatives and uses of the invention.

In this regard, the invention is shown in the several photographic and drawing figures, and is of sufficient complexity that the many parts, interrelationships, and sub-combinations thereof simply cannot be fully illustrated in a single patent-type drawing. For clarity and conciseness, several of the photos and drawing show in schematic, or omit, parts that are not essential in that view to a description of a particular feature, aspect or principle of the invention being disclosed.

All publications, patents and applications cited in this specification are herein incorporated by reference as if each individual publication, patent or application had been expressly stated to be incorporated by reference, including but not limited to: U.S. Pat. No. 6,912,886 (2005); U.S. Pat. No. 7,159,496 (2007); and U.S. Pat. No. 7,172,105 (2007), each of which shows the compound vice-clamp used in conjunction with the inventive MWS hereof, and one or more of the tools used at the various Work Positions of the inventive MWS. The Applicant hereof is also the inventor of the compound vice-clamp and the several tools shown in those patents.

FIGS. 1-4 show the inventive Mobile Work Station (MWS) 10 comprises an enclosure 12, also referred to as the "box", having an access panel 14, in this embodiment a hinged top lid, and lockable wheels 16a-16d (three being visible in this view, 16a-16c). The box 12 comprises a framework (partially seen in the rear right end) 18 to which are secured side panels 20a-20e, namely front panel 20a, rear panel 20b, right side panel 20c, left side panel 20d, and bottom panel 20e (not seen in this view). The top panel forms the lid 14, which is hinged at the back, best seen in FIG. 2, hinges 22a-22c being shown. In other embodiments, one or more additional or alternate access panels may be provided in any one or more of the side panels 20a-20d . In still another embodiment, the inventive MWS may comprise an open framework, where secure storage of tools used with the MWS is not needed, such as for interior shop work in a secure facility.

Figure 1:
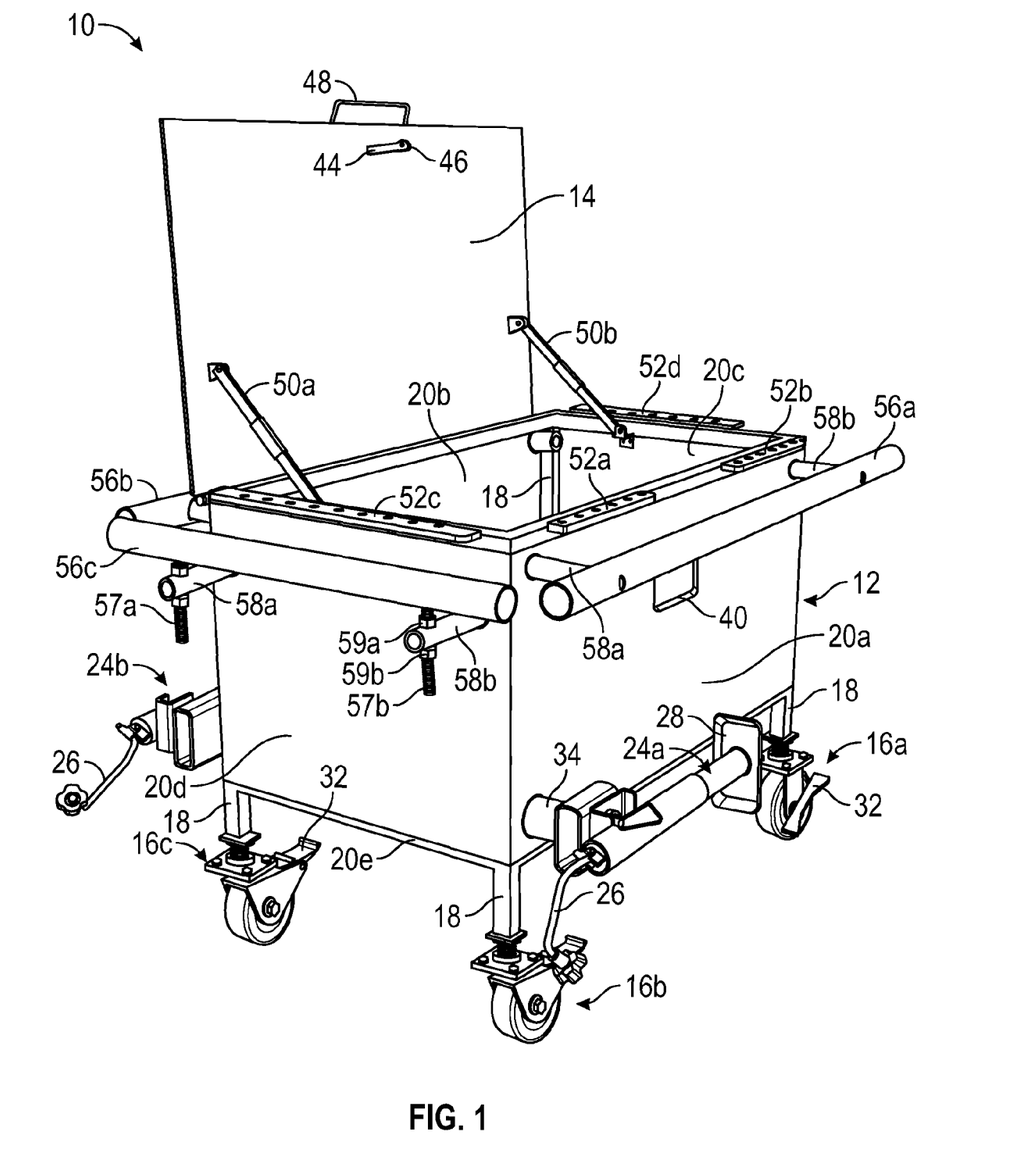
FIG. 1 is an isometric view from the front left corner of the inventive Mobile Work Station (MWS) showing the storage compartment lid open, lockable wheels, three pipe rails, and tool holders along the front and side upper margins of the box sides.
Figure 2:
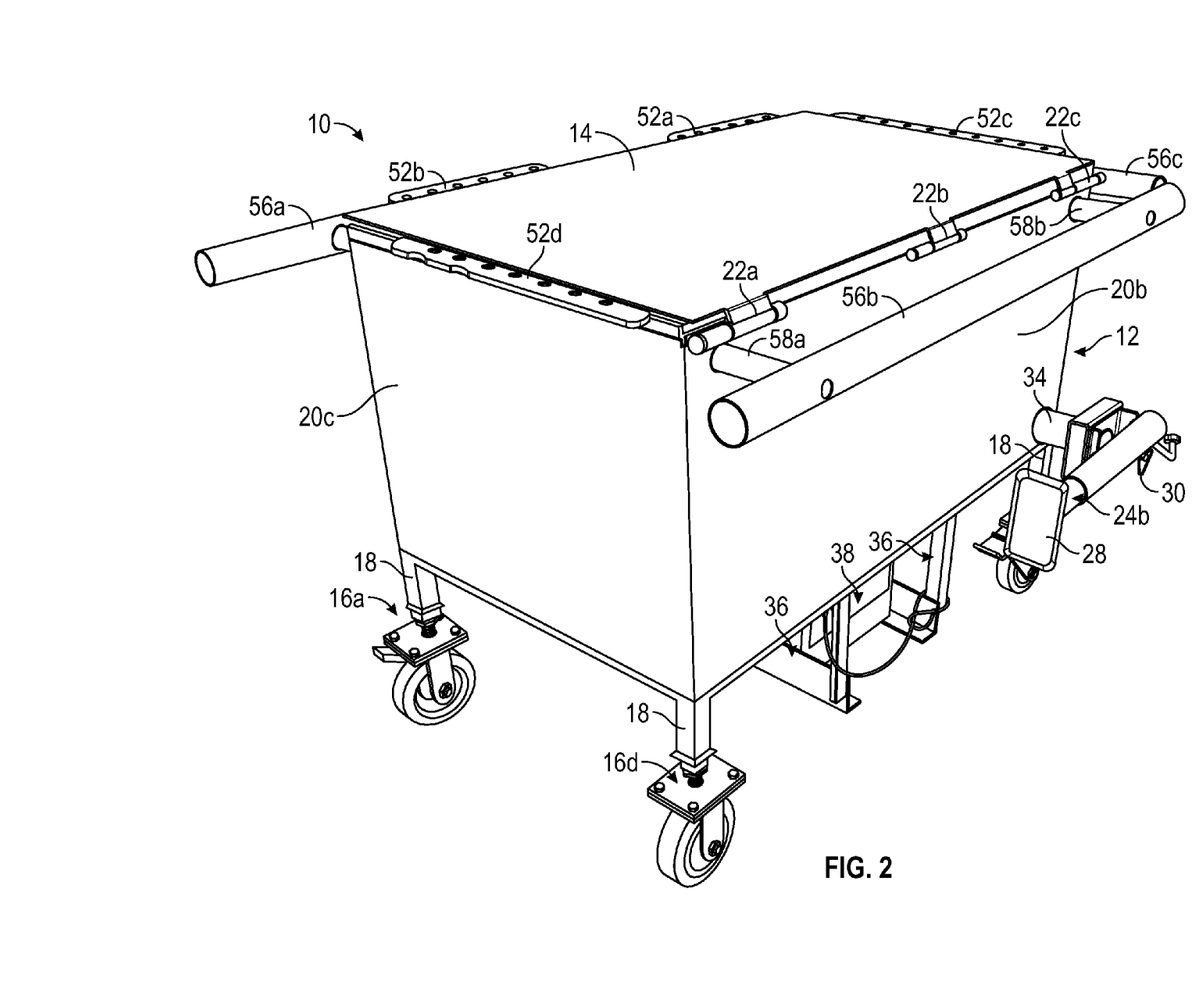
FIG. 2 is an isometric view from the rear left corner of the inventive MWS showing the lid hinges, the front-side pipe rail, the battery rack, and one leveling jack in the horizontal storage position.
Figure 3:
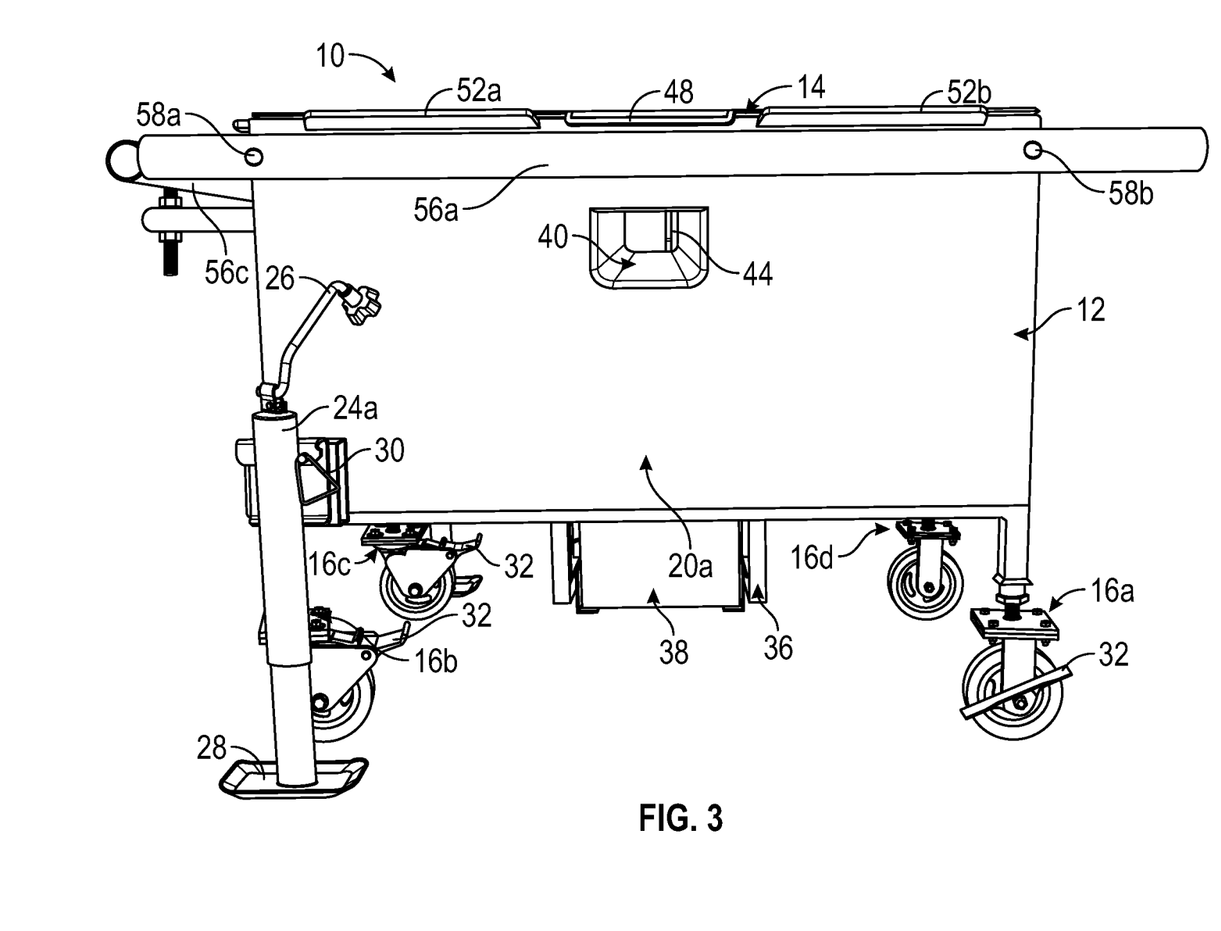
FIG. 3 is a front elevation view of the inventive MWS, showing the front side pipe rail, the lock recess, a front side leveling jack in the vertical deployed position, and with the wheel locks visible.

FIGS. 1-3 also show at least a pair of pivotable leveling jacks 24a, 24b are secured at one end of the enclosure. FIGS. 1 and 2 show the jacks in the stowed, horizontal position, while FIG. 3 show the jacks in the vertical deployed position. As best seen in FIG. 3, crank 26 raises and lowers the foot 28 of the jack assembly. By adjustment of the jack height, the top surface of the MWS can be precisely leveled in both the longitudinal and lateral directions (axes). A keeper pin 28 retains the jacks in either of the two positions: stowed horizontal position of FIGS. 1 and 2, or the deployed position of FIG. 3. Note the wheels each have standard foot-pressure locks 32. The jacks are mounted on stand-offs 34 to provide clearance for the wheels 16b and 16c.

Figure 11:
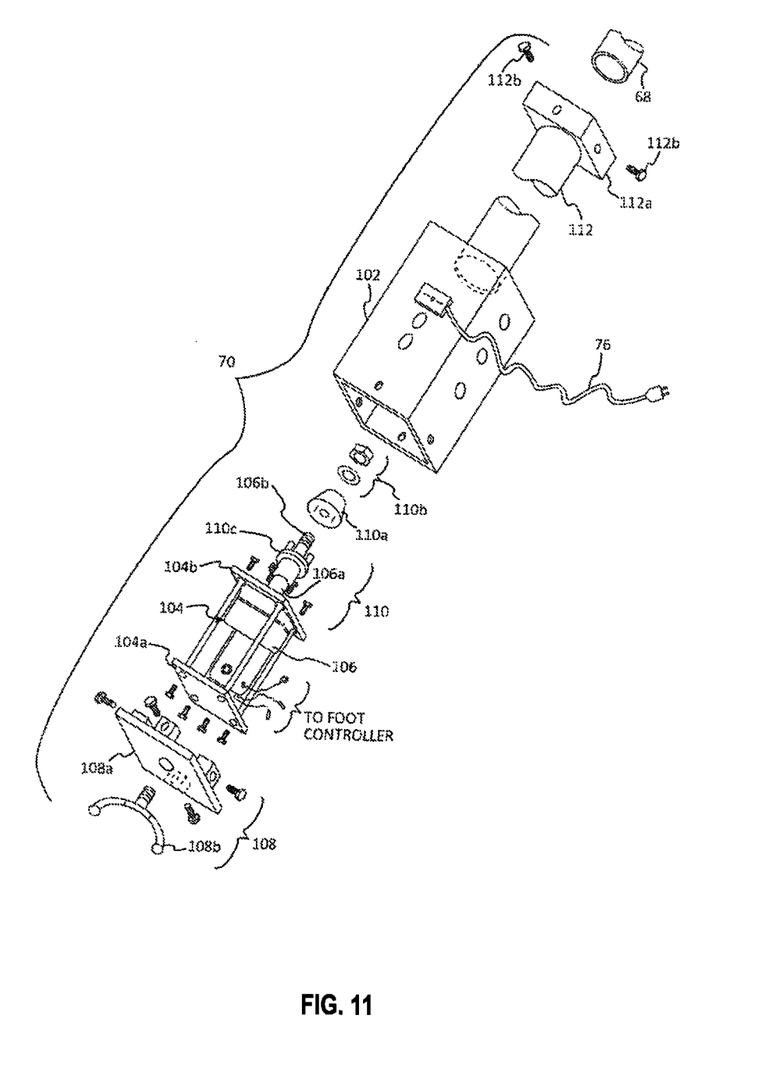
FIG. 11 is an exploded view of the motor assembly of the spinner, as mounted at MWS Station #4 in FIG. 7.

As best seen in FIGS. 1 and 3, a frame 36 is secured to the bottom of the framework 18 to receive and retain a battery 38 to provide power to various tools, e.g., the motor for the spinner assembly described in detail below, and shown in FIG. 11. As seen in FIGS. 1 and 2, the front panel 20a includes a lock recess shell 40, having a slot 42 (see FIG. 4) through which a tang 44 (see FIG. 1) fits when the lid is closed, as seen in FIG. 2. As seen in FIG. 1, the tang includes a hole 46 through which the hasp of a lock (not shown) may be passed, and then the lock is closed (locked) to prevent access to tools and equipment stored in the interior of the MWS. The lid 14 also includes a handle 48 and a pair of pivoting lid support struts 50 to keep the lid open for access. Secured to the upper margin of the front and end side walls and/or their framework 18 are a plurality of apertured tool holders 52, holders 52a-52d being shown by way of example, see also FIG. 4. These holders may also be fitted with vertical rods (not shown), typically terminating at their upper end with a shepherd's hook, from which power tools, heaters, radios, TVs or lights may be hung, as needed, such as flex shaft grinders, IR workplace heaters, spot or bar lights and the like.

Figure 4:
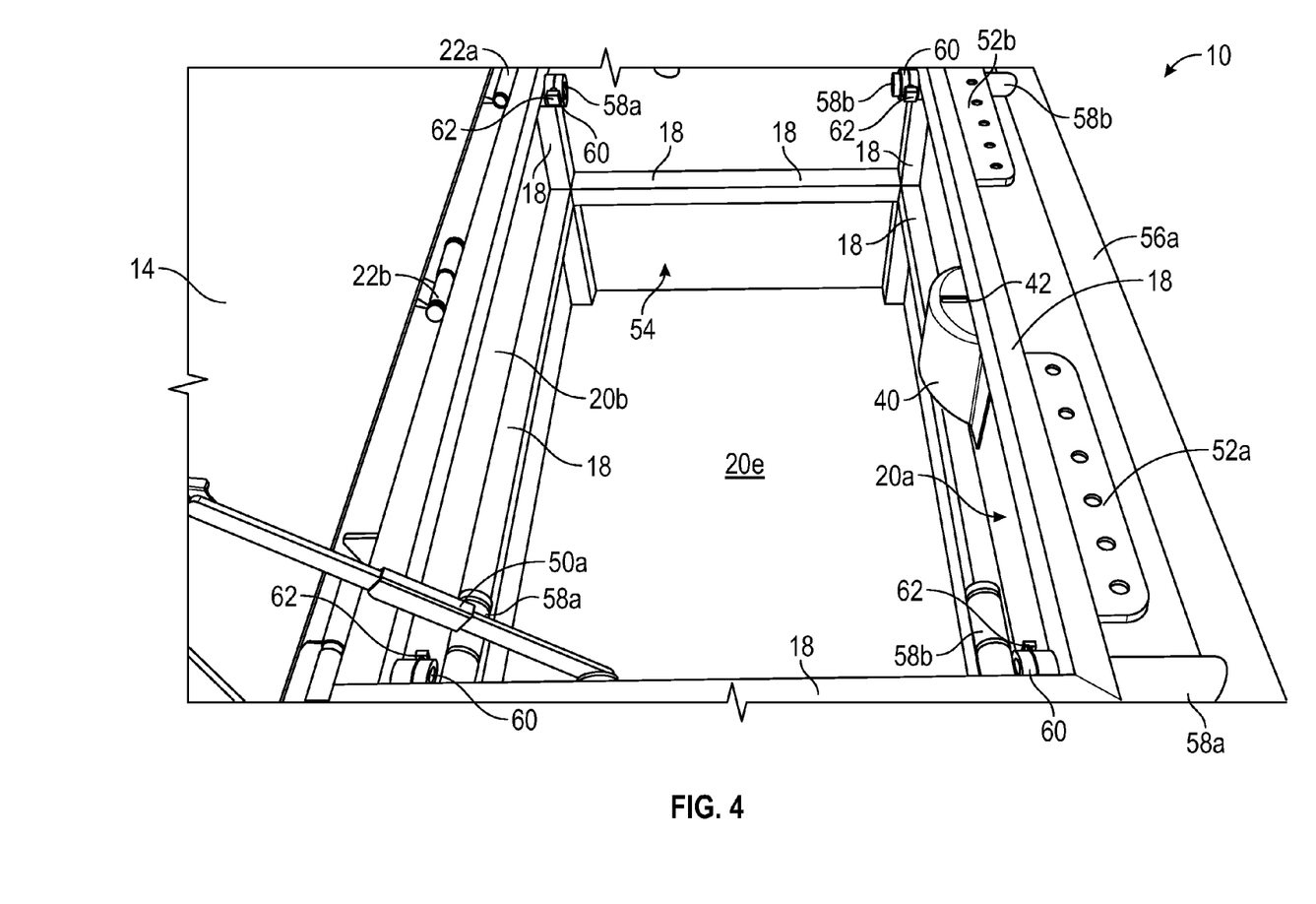
FIG. 4 is an elevated end view of the inventive MWS, showing the storage compartment interior volume, the interior framework, the lock recess shell including the lid lockable tang slot, the internal fittings for the front, back and side pipe rail adjustment supports, and tool holders along the front side edge.

FIG. 4 shows a view of the interior storage space 54. In addition the MWS framework 18 and bottom wall 20e is clearly visible. The tool holders 52a and 52b are shown welded at the upper margin of the framework 18. The holes are sized to retain typical hand tools, including but not limited to: vertical hangers; screw drivers; gauges; levels; files; pliers; welding rods; welding electrode holders; ground clamps; C-clamps; magnetic work-piece positioners; utility knives; snips; drivers; hex keys; and the like.

A key feature of the inventive MWS is the provision of precision pipe rails 56a-56c along, respectively, the front, rear and left end of the MWS enclosure. These pipe rails serve as retaining supports for the compound vice-clamp system described in more detail below in connection with FIGS. 5-10 to retain various work pieces and power tools. The longitudinal pipe rails 52a and 52b, best seen in FIGS. 1-3 are longer than the respective front and back sides 20a, 20bs of the MWS enclosure so that the clamps and tools do not interfere with the MWS. Likewise the left end pipe rail 56c, best seen in FIG. 1 is wider than the corresponding end wall 20d of the MWS enclosure. However, the pipe rail ends do not interfere because they are each supported adjacent their ends by a pair of horizontal shafts 58a, 58b which are oriented horizontally and have a length long enough to space the rails away from the MWS enclosure walls and the tool holders, as shown.

In the embodiment of the MWS shown, as to the longitudinal side wall pipe rails 56a, 56b, the horizontal support shafts 58 are pipes having an exterior end fitted in aligned bored holes in the respective pipe rails 56, and welded thereto in precise orthogonal relationship. That is, the axis of each of the two support shafts 58 intersect the central axis of their respective pipe rail 56 and all three axes are in the same horizontal plane. As best seen in FIGS. 1 and 4, the inner ends of the horizontal shafts 58 are received in sleeves 60, secured as by welding, to the framework or respective side walls. Each sleeve 60 includes a set screw 62, so that once the pipe rail is properly positioned laterally, by pushing in or pulling out the shaft 58 in its sleeve 60, the set screw 62 is tightened, locking the pipe rails in precise orientation. Thus, the front and back pipe rails 56a, 56b are positioned precisely parallel to each other, and the axis of the end pipe rail 56c can be adjusted to be precisely orthogonal to axes of the front and/or back pipe rails 56a, 56b, as required. Once that positioning is accomplished, any work pieces retained by vice-clamps on the respective rails will be precisely orthogonally position with respect to each other. Since the unit is mobile, can be wheeled into the field and leveled, the inventive MWS brings precision ordinarily possible only within a shop or factory enclosure out into the field, to obviously great advantage.

An additional precision adjustment is provided in the end pipe rail 56c. As best seen in FIG. 1, the pipe rail 56c is longitudinally supported on its respective horizontal shafts 58a, 58b. However, these shafts are not secured directly to end pipe rail 56c. Rather, each of the shafts is positioned below the end pipe rail, and each accepts a pair of vertically oriented risers 57a, 57b, respectively, each comprising a threaded rod welded to the underside of the pipe rail 56c adjacent its ends. The vertical axis of each riser 57a, 57b is oriented to intersect the horizontal, lateral axis of the end pipe rail 56, and then welded in place. Each riser 57a, 57b passes through a vertical hole provided in the respective horizontal support shafts 58a, 58b. A pair of nuts 59a, 59b are threaded on each riser to effect precise adjustment of the lateral central axis of the end pipe rail 56b to intersect the axis of either or both of the longitudinal, front and back pipe rails 56a, 56b. The upper nuts 59a ride on and contact the in-out adjusted horizontal support shafts 58a, 58b. Turning that nut with a wrench effects very fine vertical adjustment of the respective ends of the lateral horizontal pipe rail 56c. Once that pipe rail is horizontal, e.g., checking with a level, the lower nuts 59b are tightened, locking the pipe rail 56c in precise position. Note in FIG. 4, the horizontal shafts 58a, 58b of the end pipe rail 56c (seen at the bottom of the figure) project farther into the storage interior, permitting greater horizontal movement of the pipe rail 56c away from the end wall 20d (see FIG. 1) to accommodate large work pieces secured to the pipe rails.

It should be understood that one or more pipe rail(s) may be installed vertically, following the principles for support and adjustment described above. While the embodiments of the MWS shown and described herein employ three horizontal pipe rails on three of the sides of the MWS enclosure 12, more or less than three pipe rails may be installed. Thus, pipe rails may be installed on all 4 sides, or alternately, provision of sleeves 60 on the interior of the enclosure, as seen in FIG. 4, may be made on each of the 4 sides to receive rail support shafts 58, but the rails need not be mounted in the sleeves until needed, as desired for a specific job. Thus, from 1-4 pipe rails, including their precisely located support shaft pairs may be supplied with the MWS as accessories for installation as needed.

In addition, it should be understood that all of the pipe rails may be supported to be fully adjustable in the manner of the end pipe rail 56c as described herein. Likewise, as will be evident to one skilled in this art, even more precise lateral, horizontal adjustment of the pipe rails 56a, 56b, 56c (an optionally 56d on the right end) by supports 58 may be accomplished by use of horizontally oriented threaded rods, analogous to the risers 57.

Figure 5:
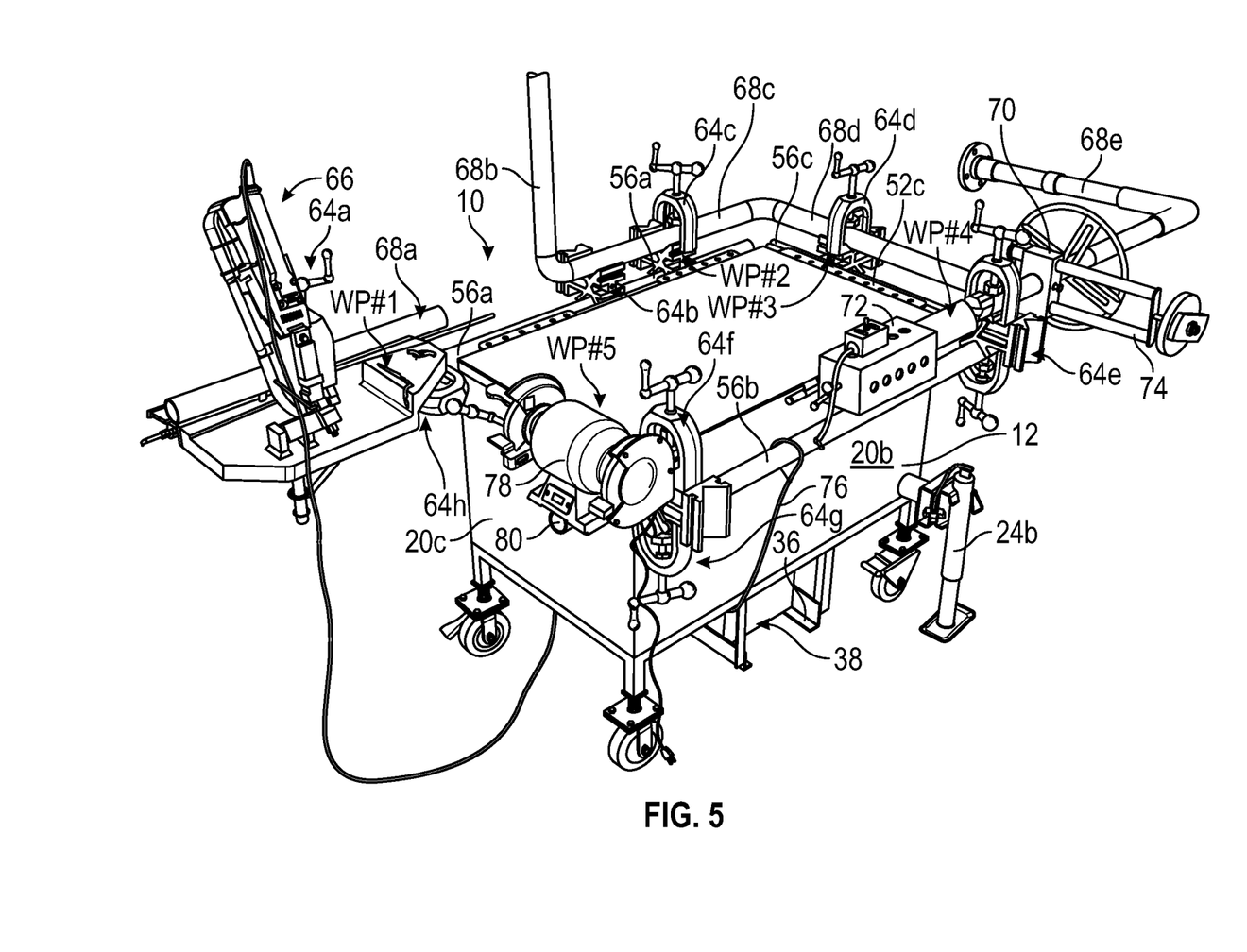
FIG. 5 is an isometric view from the left rear of the inventive MWS showing it as fully deployed and in use, having installed on the pipe rails (clockwise from top left): a power cut-off saw; pipe vices and clamp assemblies retaining pipe work pieces in precise orthogonal alignment for elbow welding; a motorized spinner assembly for precision, foot-controllable rotation of aligned abutting pipe segments for continuous welding along a circumferential path; and a bench grinder; these tools being secured in compound clamp assemblies specially configured for the pipe rails of the inventive MWS.

FIGS. 5-10 show examples of the use in the field of the inventive MWS with a wide range of tools. A series of exemplary work positions #s WP #1-WP #5 are identified on the top surface 14 of the MWS 10. A cut-off or chop saw is shown secured via a compound vice-clamp assembly to the front pipe rail 56a at WP #1. Details of compound vice-clamp assemblies 64 particularly suited for use on the pipe rails of the inventive MWS are shown and described in U.S. Pat. No. 7,159,496 (2007), the disclosure of which is hereby incorporated by reference in order to not burden the record of this application; see particularly FIGS. 1-4 and 6 of U.S. Pat. No. 7,159,496 for the compound vice-clamp 64 in use on horizontal or vertical pipe rails of the inventive MWS. U.S. Pat. No. 7,159,496 also discloses an exemplary embodiment of a cut-off or chop saw 66 in FIGS. 7-9 thereof, which may be used at WP #1, as shown in FIG. 5. As shown, an exemplary saw, here a band saw, is retained on pipe rail 56a by a pair of vice-clamps 64h, and a work piece, here a length of black iron pipe 68a, is secured by an upper clamp 64a in the V-saddle of the saw for cutting.

FIG. 5 also shows at WP #2 a vertically-oriented work piece of black iron pipe 68b that has previously been welded to a horizontal run of black iron pipe 68c via an elbow (not numbered). The horizontal run 68c is clamped at 64c, and also rests in the V-saddle of another vice clamp 64b. An orthogonally oriented run of black iron pipe 68d is secured at WP #3 by vice-clamp 64d to the side pipe rail 56c. An elbow has previously been welded to the work piece pipe section 68d. The work piece pipes 68c and 68d are now oriented precisely orthogonally for welding the elbow of section 68d to the straight run 68c. The result is a precisely configured, finished, compound-angle, vertical-horizontal pipe run.

FIG. 5 shows at WP #4 a motorized spinner, 70, 72, secured to the compound vice-clamp 64e of the type described herein and in U.S. Pat. No. 7,159,496. As shown in FIG. 5, a long, right-angled work piece of black iron pipe has been inserted in the spinner 70 for butt-welding of one straight segment to another, upon power rotation by the motor assembly 72 (see FIG. 11). The spinner 70 includes a radially extensible counterweight assembly 74 that precisely counterbalances the angled portion of the work piece extending to the left and terminating in a flange, as shown. The motor is powered by the battery 38 via power cord 76 and a standard rheostat-type foot-pedal controller (not shown). Alternatively, the motor 72 may be powered by AC mains current. The foot-controlled spinner permits precision welding, at whatever rotational speed is comfortable for the welder consistent with his/her experience, continuously around the circumference of a pipe work piece without stopping so that a continuous, unbroken weldment is formed. Not stopping during circumferential welding prevents formation of pinholes or slag-filled gaps. Details of the adjustable counter-weight spinner assembly are shown in U.S. Pat. No. 7,172,105 (2007), the disclosure of which is incorporated by reference herein to not burden this application record. The spinner assembly is engaged in the compound vice-clamp 64e as disclosed herein and in U.S. Pat. No. 7,159,496, as best seen in its FIGS. 3 and 5-7.

FIG. 5 shows at WP #5 a bench grinder 78 secured in a compound vice-clamp 64g by a short section of pipe 80 welded or bolted to the grinder base. The base pipe support 80 is received in the vice V-saddle, and clamped with the upper C-clamp member as shown. The grinder 78, as is the saw 66, is powered by 110 V cords (shown but not numbered), which are connected to mains or generator power, typically via an extension cord at a job site. Optionally, a multiplex outlet box (not shown) may be fitted in an end or side wall, e.g., 20c, into which the power cords may be plugged.

Figure 6:
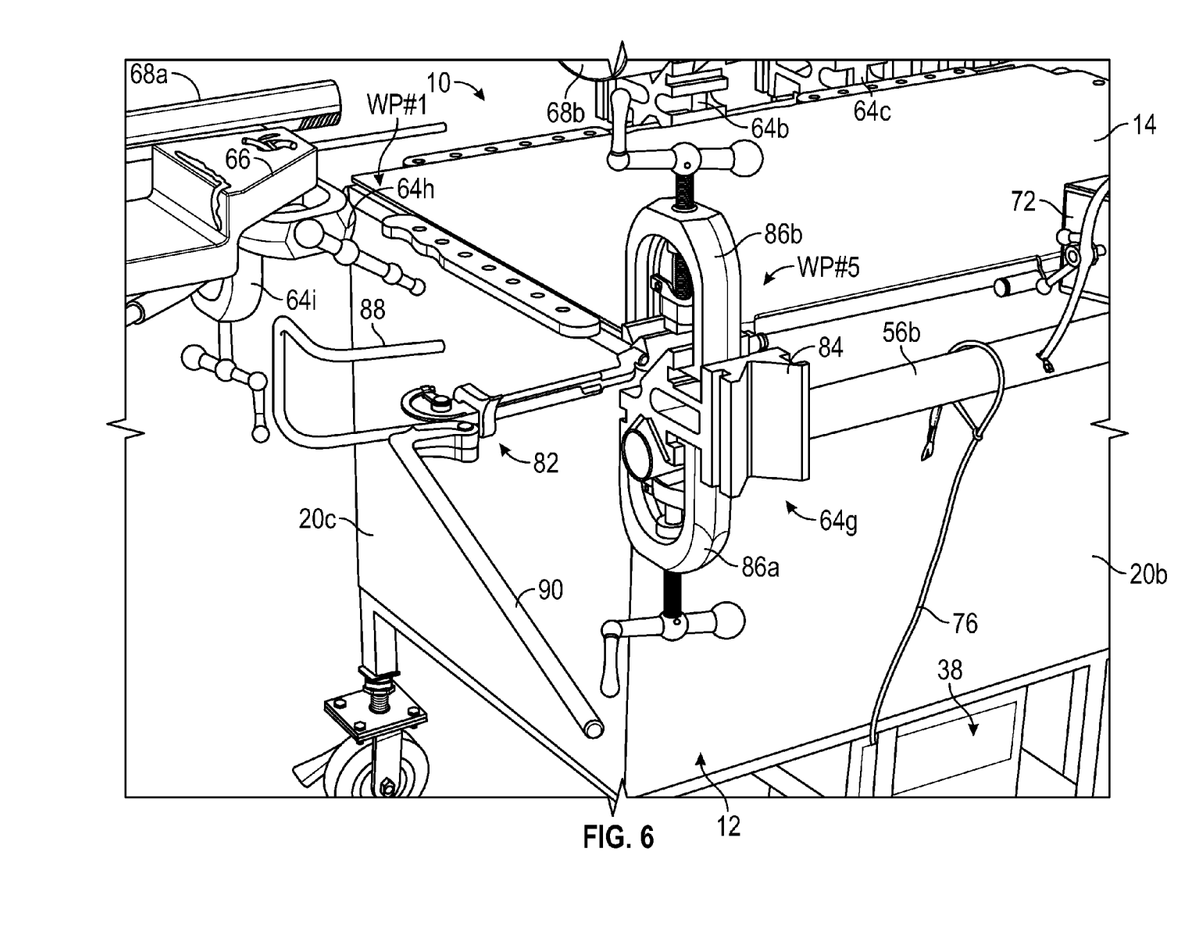
FIG. 6 is an isometric close-up view of the special clamp assembly being used at Station #5 of the inventive MWS, the clamp assembly being shown as retaining a tube bender and having an orthogonal, vertically oriented V-seat for retaining another tool.

FIG. 6 shows in close-up a tubing or rod bender 82 secured in a compound vice-clamp 64g at WP #5. This figure clearly shows the compound vice-clamp comprises a compound V-saddle body 84 and a plurality of clamps 86a, 86b being used in this instance. The lower V-saddle rests on the pipe rail 56b, and the lower clamp secures the body 84 to the rail. The tubing bender 82 includes a square handle oriented with corners aligned vertically so that they rest in the upper V-saddle, and are secured therein by the upper clamp 86b. A tubing work piece 88 is fitted in the receiver of the bender, and is ready for bending by use of lever 90. Note that this exemplary work piece tubing has already been given three previous orthogonal bends, and the result of this bending step will be a compound bent loop. An exemplary bender of the type shown herein is disclosed in detail in U.S. Pat. No. 6,912,886 (2005), the disclosure of which is incorporated by reference herein to not burden the record of this application.

Figure 7:
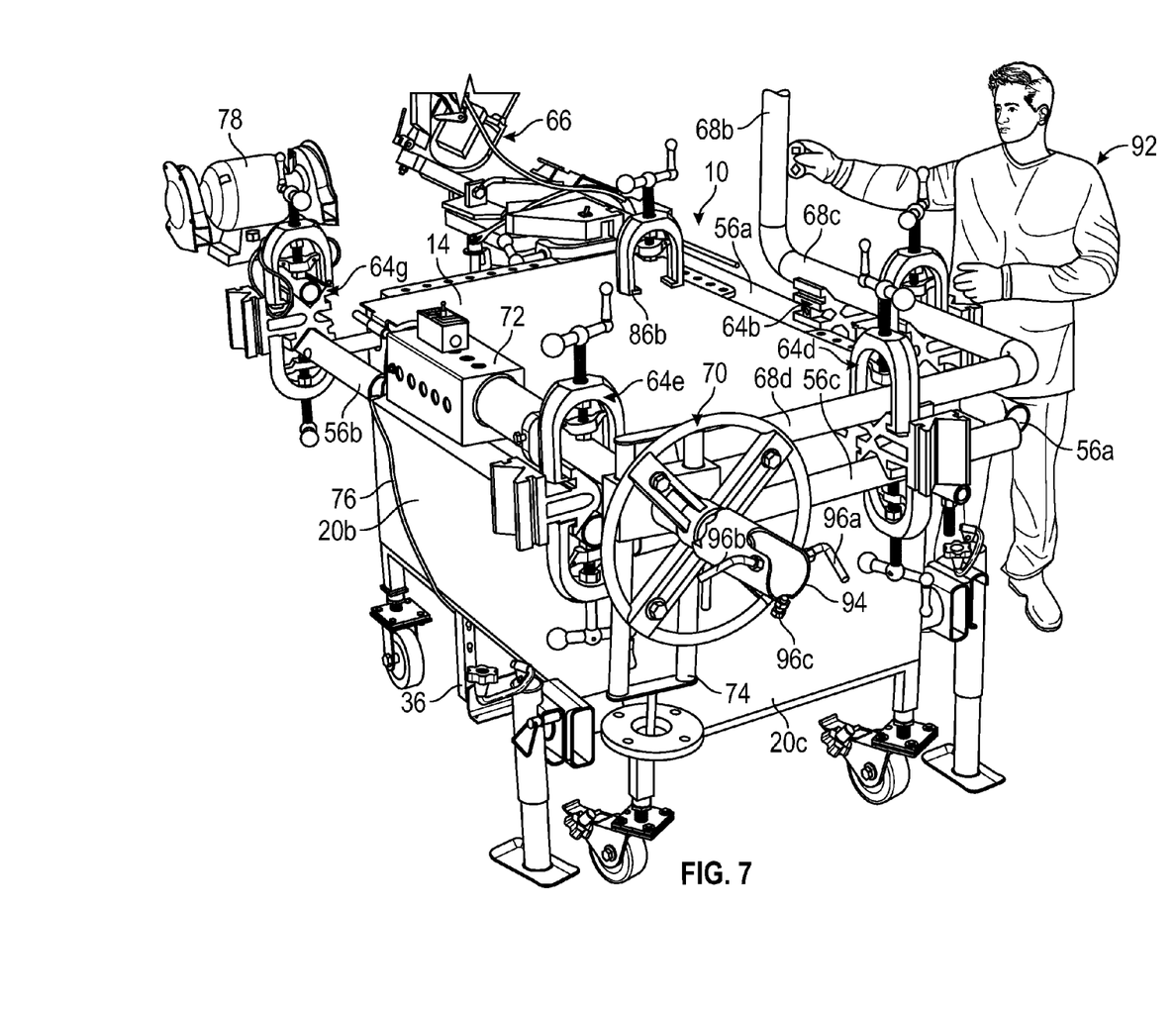
FIG. 7 is an isometric view of the inventive MWS as deployed in use showing pipe work-pieces secured in precise alignment position for welding an elbow at a compound 90°-90° orientation.

FIG. 7 is a view from the corner of the MWS opposite that shown in FIG. 5, so that description above is referred-to in order to not be duplicative. As shown in FIG. 7, a worker 92 is using a level to orient the riser pipe segment 68b vertical, so that the segment 68c will be orthogonal to the elbow of segment 68d. The elbow will then be tack-welded at the butt-end juncture of 68c (the right end) to the elbow of segment 68d; this juncture is shown as the curved line just below the left hand of the worker. In addition, the work piece receiver tube 94 is shown at the outboard end of the spinner assembly 70. The receiver 94 includes three set screws 96a-96c, oriented 120° apart around the periphery of the receiver to precisely adjust the central axis of a work piece, such as a segment of black iron pipe to be welded, to be parallel with the central axis of the spinner. The counterweight 74 is shown in the down position, as there is no work piece to be counterbalanced in the receiver in this view.

Figure 8:
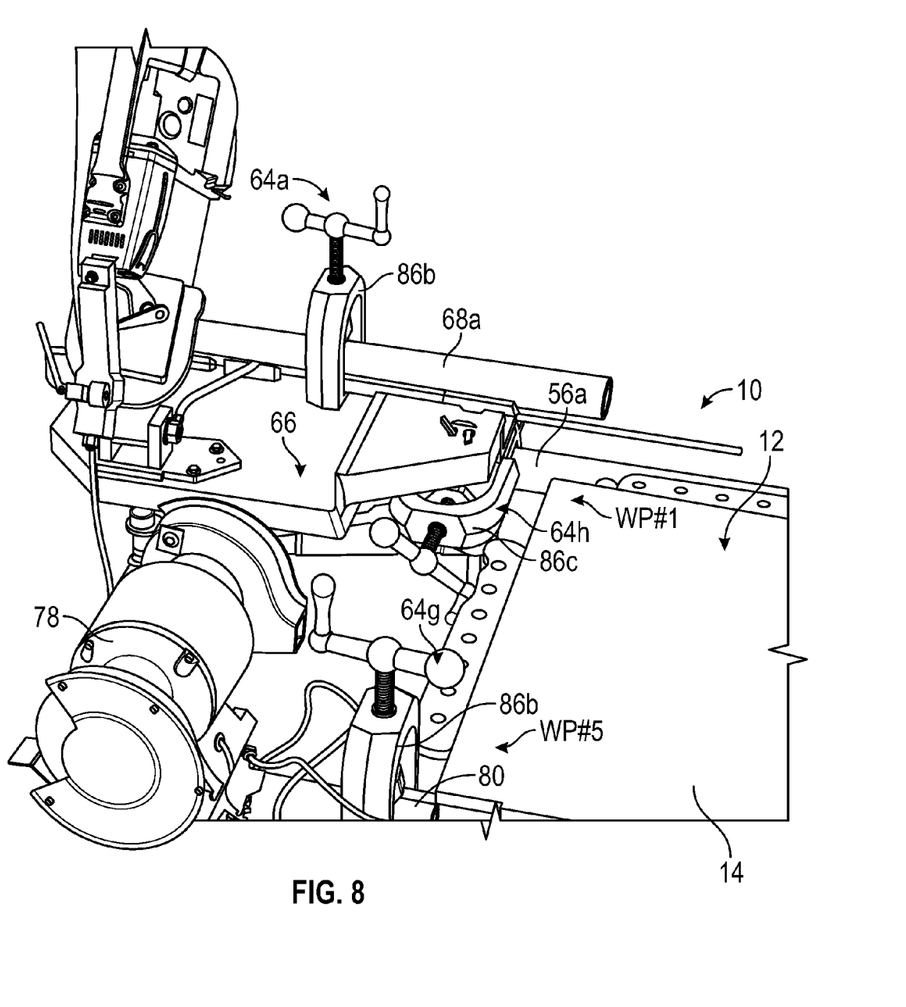
FIG. 8 is an enlarged isometric view of the MWS Stations #1 and #5, showing a cut-off saw positioned to cut-off a section of work piece pipe at Station #1, and a bench grinder secured in Station #5 to bevel the cut end of the work piece in preparation for welding.

FIG. 8 is a close-up of the saw 66 (e.g., a band saw or chop saw) and the bench grinder 78 at WP #s 1 and 5, respectively, better showing the clamp 86c retaining the saw to the pipe rail 56a, and the clamp 86b retaining the work piece pipe segment 68a in the saw V-saddle for cutting. In addition the pipe base 80 of the bench grinder 78 is shown secured by upper clamp 86b at WP #5.

Figure 9:
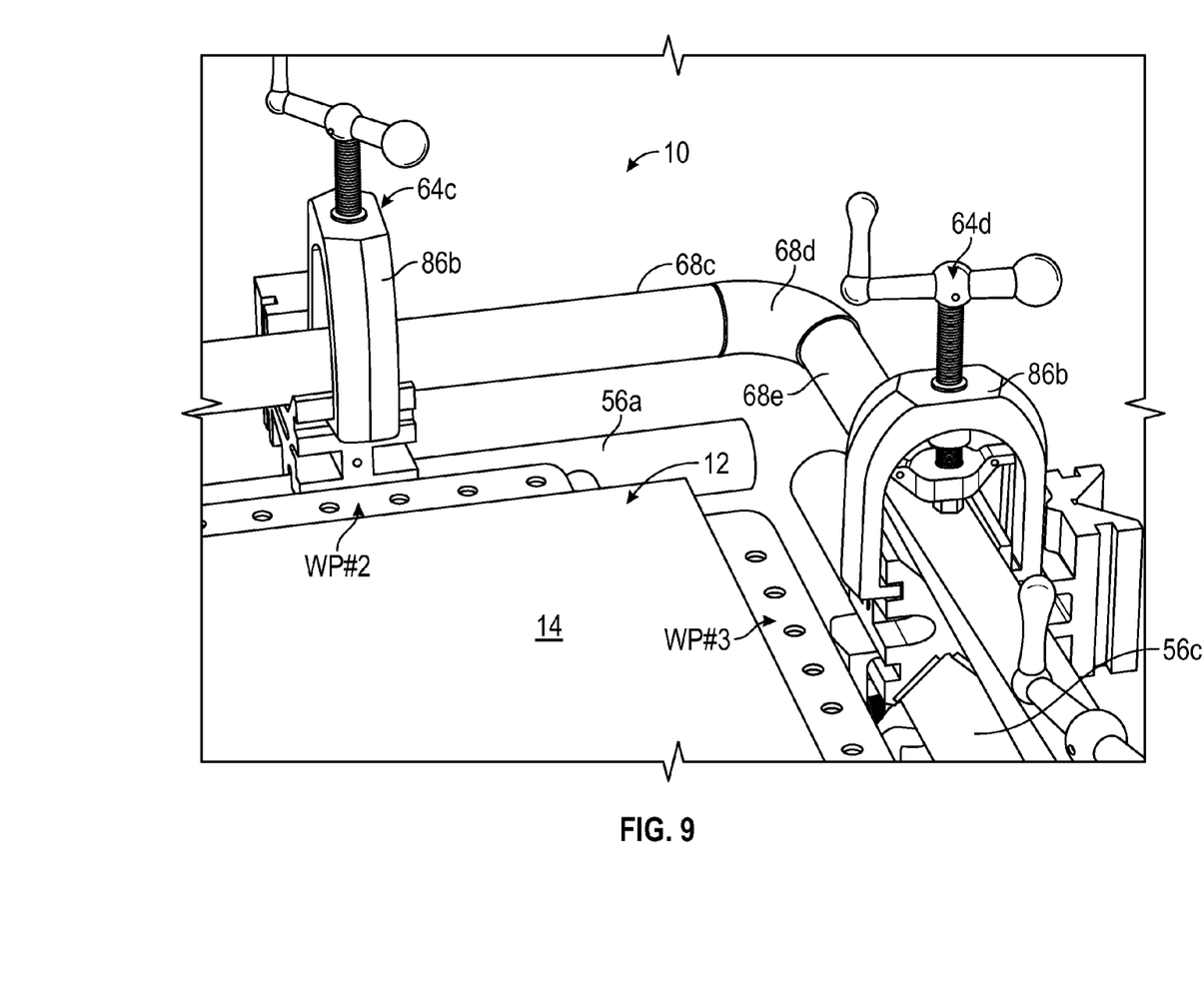
FIG. 9 is an enlarged isometric view of MWS Stations #2 and #3 showing work pieces (e.g., black pipe) secured in position for precise orthogonal welding of an elbow.

FIG. 9 is a close-up of the alignment of work piece pipe segments 68c with 68d by use of the pipe rails 56a and 56c, respectively in cooperation with the vice-clamp assemblies 64c and 64d. This figure is a close-up of the assembly process shown also in FIGS. 5 and 7. Note the upper clamps 86b engage the black iron work pieces in their respective vice-clamp assemblies 64c and 64d. Since the pipe rails 56a and 56c are precisely oriented orthogonally and level (axes intersecting), likewise the central axes of the work pieces are precisely oriented orthogonally. There remains only to rotate the work piece pipe 68d so that its elbow end is aligned in parallel with the cut-end of work piece pipe 68c. A gauge piece is used to insure the pipe ends are properly spaced, then the clamps 86b are tightened, and the work piece pipes tack-welded to each other. The full circumferential weld is completed upon transfer of the pipe end 68d to the receiver 94 of the spinner 70, see FIGS. 5 and 7.

Figure 10:
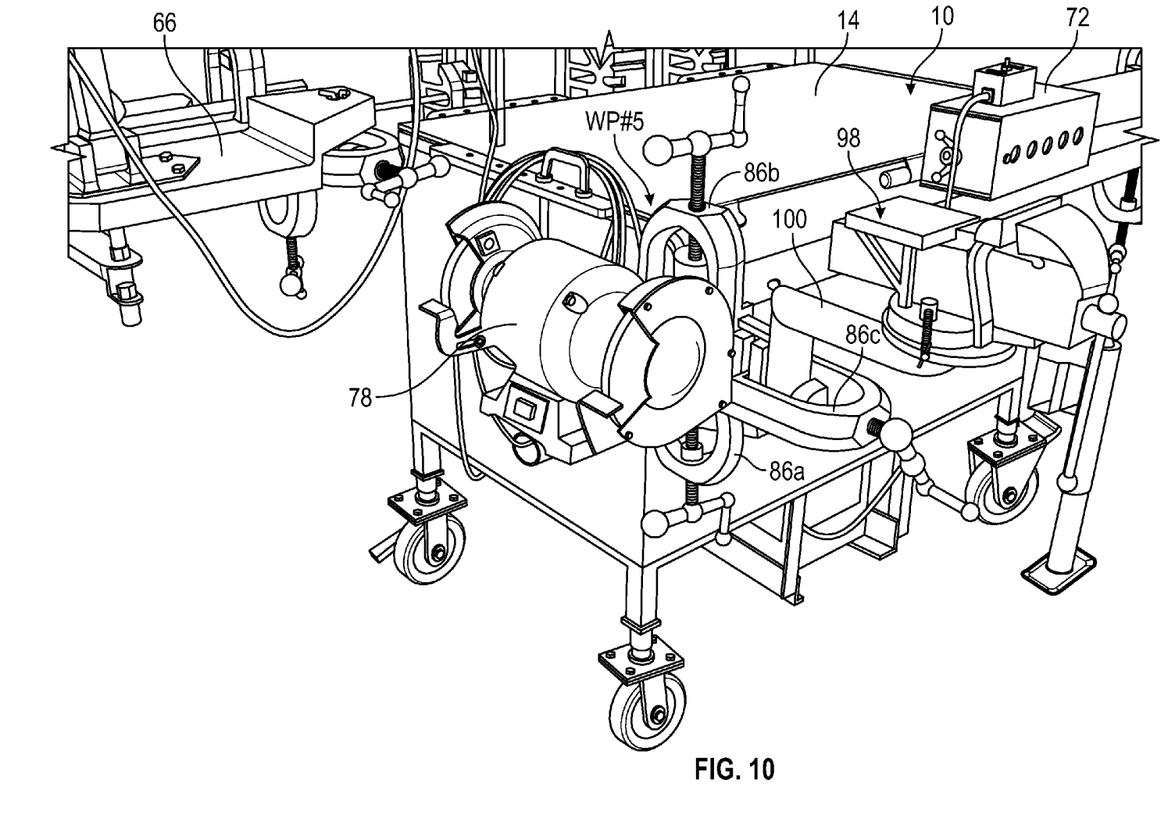
FIG. 10 is an isometric view of the MWS from the rear left showing Station #5 retaining both a bench grinder and machinist's vice in the compound clamp assembly.

FIG. 10 is another view of WP #5, showing use of the vertical V-saddle 84 (seen in FIG. 6) to retain a machinist's vice 98 at the same station as a bench grinder 78. The horizontal clamp 86c retains an inverted-L-shaped pipe support 100 welded or bolted to the bottom of the vice. FIG. 11 is an exploded isometric drawing illustrating the spinner motor 70 of FIGS. 5 and 7.

The motor assembly 70 includes an exterior housing 102, within which an axially movable cage 104 is fitted. A low RPM highly geared DC or AC motor 106, powered by the battery 38, or AC mains current, via power cord 76 (see FIG. 5), is fitted in the cage 104. A pressure plate assembly 108 closes off one end of the housing 102 by means of the 4 bolts as shown, threaded through holes in the housing to engage lugs on the inner face of the pressure plate 108a. A threaded crank 108b includes a stem long enough to engage the back plate 104a of the cage 104. By turning the crank, the motor cage assembly 104 (including the motor 106 retained therein) is slidably advanced or retracted in the housing 102. The drive shaft 106a projects through a hole (not shown) in the front plate 104b of the cage 104. A cone friction clutch assembly 110 engages the butt end of the work piece 68 that is received in sleeve assembly 112 that is secured to the closed end (right end as seen in FIG. 11) of the housing. The tubular bore of sleeve 112 communicates with the interior of the housing 102 so that the cone clutch, mounted on the outboard end of driveshaft 106a can engage the work piece to effect rotation of the work piece during welding in order to permit smooth circumferential welding of the work piece to a second work piece. The cone clutch assembly 110 comprises a conical thrust piece 110a which is secured to the threaded outboard end of the drive shaft 106b by a washer and nut 110b. A pronged stop washer 110c, secured to the drive shaft 106b so that it does not rotate independent of the drive shaft, engages slots in the back face of the conical thrust piece 110a. This assures a positive rotational drive of the work piece journalled in the sleeve 112, without slippage of the inner face of the conical thrust piece against the stop 110c. As best seen in FIGS. 5 and 7, the motor assembly collar 112 is secured to the receiver of the spinner via a collar 112a and set screws 112b. Upon inserting a work piece 68 into the receiver 94 and engaging the thrust piece 110a, the crank is turned to insure a good frictional drive contact. The motor is powered and the rate of rotation is controlled by the foot controller.

INDUSTRIAL APPLICABILITY

It is clear that the inventive Mobile Work Station of this application has wide applicability to the construction, welding and pipe-fitting industry, namely to remote field operations. The inventive MWS system has the clear potential of becoming adopted as the new standard for precision fabrication work stations, including secure storage for field operations. The inventive MWS offers a complete system of precisely aligned rails and universal vice-clamps that can be used to secure both work pieces and a wide variety of power and hand tools.

It should be understood that various modifications within the scope of this invention can be made by one of ordinary skill in the art without departing from the spirit thereof and without undue experimentation. For example, the enclosure can have a wide range of designs to provide the functionalities disclosed herein. Likewise the pipe rails may be oriented both vertically and horizontally to provide additional fabrication options. This invention is therefore to be defined by the scope of the appended claims as broadly as the prior art will permit, and in view of the specification if need be, including a full range of current and future equivalents thereof.

---

Parts List (This Parts List is provided as an aid to Examination and may be canceled upon allowance)

10 Inventive mobile workstation (MWS)
12 Enclosure (Box)
14 Access panel
16 a-d Lockable wheels
18 Framework -continued Parts List (This Parts List is provided as an aid to Examination and may be canceled upon allowance)

20 a-20 e enclosure sides & bottom panels
22 a-c Lid (top panel) hinges
24 a, b Leveling jacks (pivotable)
26 Crank for leveler jacks
28 Foot plate
30 Keeper pin
32 Wheel locks
34 Stand off
36 Battery framework
38 Battery
40 Lock recess shell
42 Slot in top of lock shell
44 Tang
46 Hole in tang for lock
48 Handle
50 a, b Lid struts
52 Tool holder
54 Storage space
56 Pipe rails a, b, c
57 Threaded riser rods
58 Support shafts (3 pairs)
59 Adjustment nuts
60 Sleeves
62 Set screw
64 Vice clamp assembly
66 Saw
68 Work piece, e.g., black iron pipe
70 Spinner assembly
72 Spinner Motor assembly
74 Counterweight assembly
76 Power cord
78 Bench grinder
80 Grinder pipe support
82 Tubing or rod bender
84 Compound V-saddle body
86 C-Clamps
88 Tubing work piece
90 Bending lever
92 Worker
94 Receiver of Spinner Assy
96 Set screws
98 Machinist's Vice
100 Inverted L-pipe-support for Vice
102 Motor Housing
104 Motor Cage
106 Motor
108 Pressure Plate Assembly
110 Cone clutch Assembly
112 Workpeice Sleeve Assembly
114
116
118
120

MWS Mobile Work Station
WP#1-5 Work Positions #s 1-5

The invention claimed is:

1. A mobile work station, that is robust and field usable for precision fabrication work, comprising in operative combination:
   a. a framework assembly defining opposed, spaced side, end, bottom and top planes to form an enclosure space, a juncture of said side, end and bottom planes defining support corners;
   b. lockable wheels mounted to said framework assembly so that one of said wheels is disposed at each support corner of said enclosure space;
   c. at least a pair of leveling jacks disposed mounted at one end of said framework assembly to permit horizontal leveling of said mobile work station in both a longitudinal X axis and an orthogonal lateral Y axis, both axes lying in a horizontal plane; and
   d. at least a pair of horizontal pipe rails having a length and a central axis along said length for retaining work pieces or tools in a precise orientation, each said rail is mounted to said framework assembly, at least one rail of said at least a pair of pipe rails is oriented longitudinally on, and spaced from, a side of said framework assembly, and at least a second rail of said at least a pair of pipe rails is oriented transversely on, and spaced from, an end of said framework assembly, and each said rail being adjustable at least one of laterally and vertically, said at least a second rail being selectively vertically adjustable to be level independent of the work station, so that said central axes of said rails are precisely orthogonal to each other in at least a horizontal plane to permit field fabrication or joining of work pieces at precise angular orientations.

2. The mobile work station of claim 1 wherein said at least a pair of pipe rails includes at least a longitudinal side pipe rail and a transverse end pipe rail, each said rail having a central axis, said rails being mounted to said framework assembly so that the central axis of said longitudinal side rail and the central axis of said transverse end pipe rail are selectively adjustable to be orthogonal to each other.

3. The mobile work station of claim 2 wherein said at least a side pipe rail is mounted adjacent its opposed ends to horizontally extending support tubes, said support tubes being adjustably mounted to said framework assembly to permit precise lateral adjustment of a longitudinal central axis of said at least a longitudinal side pipe rail with respect to any rail mounted parallel or orthogonal thereto.

4. The mobile work station of claim 2 wherein said support tubes have central axes which are disposed orthogonal to said central axis of said longitudinal pipe rail, and the support tubes and longitudinal side pipe rail central axes lie in the same plane.

5. The mobile work station of claim 2 wherein said transverse end pipe rail includes a pair of vertical threaded risers, one of each of said pair of risers is mounted adjacent an end of said transverse end pipe rail, each said riser having a vertically oriented central axis, and the vertical riser axes and transverse end pipe rail central axes lie in the same vertical plane.

6. The mobile work station of claim 5 which includes a pair of spaced horizontally extending supports mounted to said framework assembly at least at an end or side of said enclosure space, said supports being mounted below the central axis of a corresponding transverse end or longitudinal or side pipe rail, each said support including a bore for receiving there-through a riser, and each riser including an upper nut threaded thereon to rest on the top of said support to permit fine vertical adjustment of said pipe rail to place said pipe rail central axis in a horizontal plane, and a lower locking nut threaded on said riser below said support bore to secure said upper nut to the top of said riser.

7. The mobile work station of claim 1 wherein said at least a pair of pipe rails includes two longitudinal side pipe rails and at least one transverse end pipe rail, each said rail having a central axis, said rails being mounted to said framework assembly so that the central axes of said longitudinal side rails and the central axis of said at least one end pipe rail are selectively adjustable to be orthogonal to each other.

8. The mobile work station of claim 7 wherein each of longitudinal side pipe rails is mounted adjacent its opposed ends to horizontally extending support tubes, said support tubes being adjustably mounted to said framework assembly to permit precise lateral adjustment of the central axis of said longitudinal side pipe rail with respect to any rail mounted parallel or orthogonal thereto.

9. The mobile work station of claim 8 wherein said support tubes have central axes which are disposed orthogonal to said central axis of said longitudinal side pipe rail, and the support tubes and longitudinal side pipe rail central axes lie in the same plane.

10. The mobile work station of claim 9 wherein said transverse end pipe rail includes a pair of vertical threaded risers, one of each of said pair of risers is mounted adjacent an end of said transverse end pipe rail, each said riser having a vertically oriented central axis, and the vertical riser axes and transverse end pipe rail central axes lie in the same vertical plane.

11. The mobile work station of claim 10 which includes a pair of spaced horizontally extending supports mounted to said framework assembly at least at an end or side of said enclosure, said supports being mounted below the central axis of said corresponding end or side pipe rail, each said support including a bore for receiving there-through a riser, and each riser including an upper nut threaded thereon to rest on the top of said support to permit fine vertical adjustment of said pipe rail to place said pipe rail central axis in a horizontal plane and a lower locking nut threaded on said riser below said support bore to secure said upper nut to the top of said riser.

12. The mobile work station of claim 1 in which said framework assembly is enclosed with side, end, top and bottom panels to form a container defining an interior volume for storage of tools, supplies and parts within said container.

13. The mobile work station of claim 12 wherein at least one of said side, end and top panels is hinged in whole or in part to provide selective access to at least a portion of said interior volume.

14. The mobile work station of claim 13 the at least one panel providing selective access is lockable to provide security to said at least a portion of said interior volume of said container.

15. The mobile work station of claim 1 which includes a framework assembly disposed secured to a bottom of the mobile work station for retaining a battery.

16. The mobile work station of claim 12 which includes at least one tool holder secured to said framework assembly or one of said panels, said tool holder being configured to engage and retain at least one hand tool or tool hanger.

17. The mobile work station of claim 1 wherein said leveling jacks are mounted on stand-offs secured to said framework assembly above their respective end corners so as to not interfere with said lockable wheels mounted to said support corners.

18. The mobile work station of claim 1, wherein said at least a pair of pipe rails further includes at least a third rail oriented transversely on, and spaced from an end of said framework assembly, said at least a third rail being selectively vertically adjustable to be level independent of the work station.

19. The mobile work station of claim 1 wherein said at least a pair of pipe rails includes at least two opposed longitudinal side pipe rails which are adjustable so that the central axes of each is parallel to each other, and are mounted to said framework assembly so that both the central axes of said longitudinal side rails lie in the same horizontal plane, said mobile work station includes at least one end pipe rail which is both vertically adjustable so that its central axis lies in said same horizontal plane that the central axes of said longitudinal side rails lie, and is longitudinally adjustable at each end of said end pipe rail so that the central axis of said end pipe rail is orthogonal to the central axes of both longitudinal pipe rails, and said pipe rails receivingly engage a plurality of vice clamps configured to retain power and hand tools simultaneously at a work position designated along a length of said pipe rails.

* * * * *